(12) United States Patent
Kumar et al.

(10) Patent No.: US 10,936,975 B2
(45) Date of Patent: Mar. 2, 2021

(54) SYSTEM AND METHOD FOR CHANGING RESOURCE CALENDARS BY EDITING CALENDAR VIEWS

(71) Applicant: ORACLE INTERNATIONAL CORPORATION, Redwood Shores, CA (US)

(72) Inventors: Manish Kumar, Bangalore (IN); Vaibhav Aparimit, Bokaro Steel (IN); Raghavan Srinivasan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1302 days.

(21) Appl. No.: 14/550,052

(22) Filed: Nov. 21, 2014

(65) Prior Publication Data
US 2016/0148148 A1    May 26, 2016

(51) Int. Cl.
*G06Q 10/06* (2012.01)
*G06F 3/0484* (2013.01)

(52) U.S. Cl.
CPC .  *G06Q 10/063116* (2013.01); *G06F 3/04842* (2013.01); *G06Q 10/063118* (2013.01)

(58) Field of Classification Search
CPC .... G06Q 10/063116; G06Q 10/063118; G06F 3/04842
USPC ................................. 705/7.16, 7.18
See application file for complete search history.

(56) References Cited

U.S. PATENT DOCUMENTS

| | | | |
|---|---|---|---|
| 6,049,776 A * | 4/2000 | Donnelly | G06Q 10/063112 705/7.14 |
| 8,037,021 B2 | 10/2011 | Adler et al. | |
| 8,239,234 B2 | 8/2012 | Guiheneuf et al. | |
| 8,400,467 B1 * | 3/2013 | Ponce de Leon | G06Q 10/06316 345/619 |
| 2002/0077842 A1 * | 6/2002 | Charisius | G06Q 10/0633 705/1.1 |
| 2007/0106931 A1 | 5/2007 | Vartiainen et al. | |
| 2008/0195452 A1 * | 8/2008 | Ponce de Leon | G06Q 10/06 705/7.12 |
| 2009/0063947 A1 | 3/2009 | Anderson | |
| 2010/0031262 A1 | 2/2010 | Baird-Gent | |

(Continued)

OTHER PUBLICATIONS

"Oracle Primavera® P6™ Project Management Reference Manual Version 7.0", 2009 (Year: 2009).*

(Continued)

*Primary Examiner* — Charles Guiliano
*Assistant Examiner* — Po Han Lee
(74) *Attorney, Agent, or Firm* — Kraguljac Law Group, LLC

(57) ABSTRACT

Systems, methods, and other embodiments for providing management of activities of a project plan associated with a computer application are described. In one embodiment, a calendar view of an activity is edited to change a number of calendar time units over which the activity is to be performed. In response to updating the calendar view of the activity, resource data structures are updated for multiple resources assigned to the activity. The resource data structures are updated to reflect the change in the number of calendar time units for each assigned resource. For each assigned resource, the number of calendar time units corresponds to a period of time for which the resource is assigned to the activity.

12 Claims, 9 Drawing Sheets

(56) References Cited

U.S. PATENT DOCUMENTS

| | | | |
|---|---|---|---|
| 2011/0125539 A1* | 5/2011 | Bollapragada | G06Q 10/043 705/7.12 |
| 2013/0073328 A1* | 3/2013 | Ehrler | G06Q 10/063118 705/7.17 |
| 2013/0191145 A1 | 7/2013 | Nudd et al. | |
| 2013/0212197 A1 | 8/2013 | Karlson | |
| 2014/0278662 A1* | 9/2014 | Reed | G06Q 10/0631 705/7.17 |

OTHER PUBLICATIONS

"Open Workbench—User Guide Service Pack 02.1.01", Nov. 29, 2013, to CA Technologies (Year: 2013).*

Zilicus Blog—Project Management Software, Early Preview of Zilicus Project Management Software: ZilicusPM 7.2; posted on Sep. 26, 2013 and downloaded May 13, 2014 from: http://blog.zilicus.com/wordpress/tag/copy-paste-task/; pp. 1-5.

Ontrack—Defining a 7 Day Work Week, Blog posted on Sep. 12, 2013 and downloaded May 13, 2014 from: http://blog.aecsoftware.com/2013/09/defining-7-day-work-week/; pp. 1-2.

Oracle—Define Project Plan Tasks and Schedule; downloaded Nov. 13, 2014 from: https://docs.oracle.com/cloud/latest/erpcs_common/OAPEM/F1122096AN10FD9.html/; pp. 1-10.

Vecal—VCOrganizer—Sync Android and Outlook—downloaded May 13, 2014 from: http://www.vecal.biz/vcorganizer-pro.html (pp. 1-8).

Vecal—VCOrganizer—Features Review—downloaded May 13, 2014 from: http://vecal.biz/vco_event_move.html (pp. 1-2).

Basecamp—Moving Items Between Projects and Copying Items—downloaded May 13, 2014 from: https://basecamp.com/help/guides/projects/move-items#moving; (pp. 1-4).

Asana—Asana Guide—Creating Tasks—downloaded May 13, 2014 from: https://asana.com/guide/learn/tasks/creating (p. 1-6).

Alex S. Brown—Real-Life MS Project: Calendars—Alex S. Brown, PMP IPMA-C—downloaded May 13, 2014 from: http://www.alexbrown.com/msproj-calendar.html (pp. 1-5).

Getting Started with Open Workbench—downloaded May 13, 2014 from: https://support.ca.com/cadocs/0/CA%20Clarity%20PPM%2013%202%2000%20%20On%20Demand%20-ENU/Bookshelf_Files/HTML/owb/index.htm?toc.htm?GettingStarted.html (p. 1-32).

Microsoft—Copy a Task, Resource, or Project Element—downloaded May 13, 2014 from: http://office.microsoft.com/en-in/project-help/copy-a-task-resource-or-project-element-HP001226025.aspx; (pp. 1-2).

WIKI—SAP PPM Overview—downloaded May 13, 2014 from: http://wiki.scn.sap.com/wiki/display/PLMCS/SAP+PPM+Overview; (p. 1).

* cited by examiner

SYSTEM AND METHOD FOR CHANGING RESOURCE CALENDARS BY EDITING CALENDAR VIEWS

BACKGROUND

A project plan may include many activities to be performed (tasks) for a project. There are often situations where organizations are to perform multiple related activities, for example, as part of a project plan. The activities may be related for the overall objective, and resources are often used (or consumed) in performance of the activities.

Project management software that provides calendar views of activities are extensively used by project managers to visualize, for example, daily or weekly views of activities planned for a given day, week, month, or year. Clicking on a single day's view shows the planned activities for that day. A "critical path activity" is an activity that is to be started and finished at times which ensure that the project will end on schedule. There are frequent situations when a given activity is on a critical path such that resources are to be over allocated, or work is to be performed on what was originally scheduled to be a non-working day, to ensure that the overall project does not get delayed.

When a given activity is on a critical path and work is to be performed on what was originally scheduled to be a non-working day, a project manager would have to identify the resources for the activity and edit a separate resource calendar for each of the resources to change a non-working day to a working day for the activity. Alternatively, a project manager would have to go to a project schedule view and select or check all resources for the activity where those resources need to work on what was originally designated as a non-working day. These can be time consuming endeavors for the project manager when there are many resources assigned to the activity.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments for providing management of activities and associated resources of a project plan associated with a computer application are disclosed. Example embodiments are discussed herein with respect to computerized project plan management (PPM), where individual activities are defined and are to be performed over a determined time period as indicated by calendar time units in a calendar view of each activity. In one embodiment, a project management tool is disclosed that is configured to automatically update multiple resource calendar views for resources assigned to an activity by simply editing a single calendar view of the activity, instead of editing each resource calendar view.

In one embodiment, a calendar view may be configured to show a number of different calendar time units for an activity. The project management tool allows a user to change the number of different calendar time units and then automatically propagates the change to other calendars. For example, a displayed calendar view of an activity of a project plan may be edited in response to user interaction with a graphical user interface of the project management tool. The edit may result in a change to a number of calendar time units over which the activity is to be performed. In response, each resource calendar of each resource assigned to the activity is automatically updated. The update results in a change to a number of calendar time units for which the resource is assigned to the activity.

That is, the number of calendar time units for which the resource is assigned to the activity is automatically updated or changed. The update or change reflects the edited change to the number of calendar time units over which the activity is to be performed. In this manner, all resource calendars may be updated automatically and immediately based on a single edit to the calendar view of the associated activity. As such, for example, any extension of the number of days to complete an activity (e.g., by editing a calendar view of an activity to change one or more non-working days to working days) is immediately reflected in the associated resource calendar views.

Figure 1:
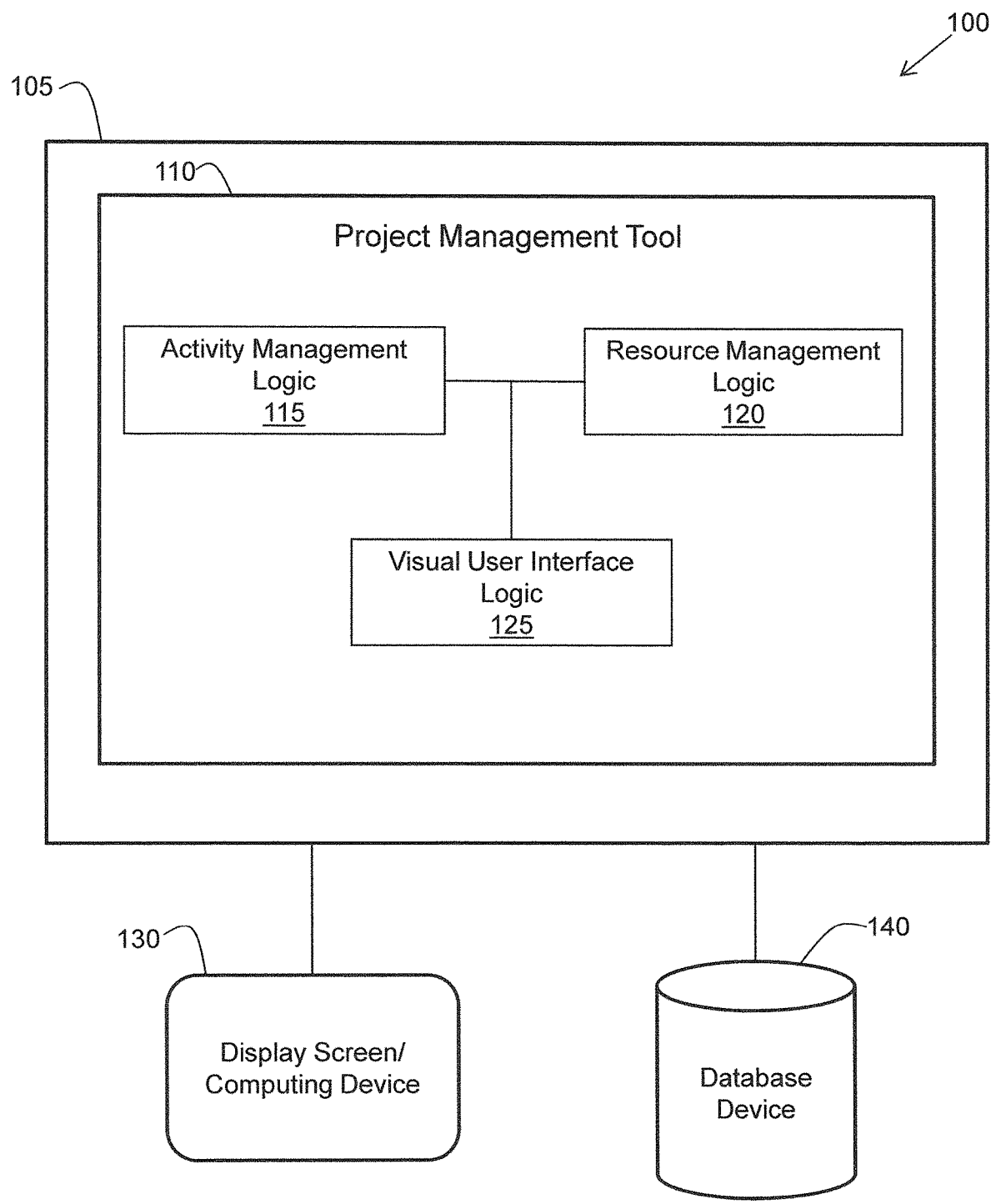
FIG. 1 illustrates one embodiment of a computer system, having a computing device configured with a project management tool.

FIG. 1 illustrates one embodiment of a computer system 100 that includes a computing device 105 configured with a project management tool 110. For example, in accordance with one embodiment, the project management tool 110 may be part of a project planning computer application of a company, configured to facilitate the managing of multiple activities and resources of a project plan. In accordance with one embodiment, a graphical user interface is provided by the project planning computer application (e.g., by a visual user interface logic of the project management tool 110). In one embodiment, the project planning computer application may comprise construction management software that computerized the process for constructing a building or other object. In one embodiment, the software and computing device 105 may be configured to operate with or be implemented as a cloud-based networking system, a software-as-a-service (SaaS) architecture, or other type of computing solution.

With reference to FIG. 1, in one embodiment, the project management tool 110 is implemented on the computing device 105 and includes logics for implementing various functional aspects of the project management tool 110. In one embodiment, the project management tool 110 includes an activity management logic 115, a resource management logic 120, and a visual user interface logic 125.

However, other embodiments may provide different logics or combinations of logics that provide the same or similar functionality as the project management tool 110 of FIG. 1. In one embodiment, the project management tool 110 is an executable application including algorithms and/or program modules configured to perform the functions of the logics. The application is stored in a non-transitory medium.

The computer system 100 also includes a display screen 130 operably connected to the computing device 105. In accordance with one embodiment, the display screen 130 is used to display views of and facilitate user interaction with a graphical user interface (GUI) provided by the visual user interface logic 125 for project management. In one embodiment, the project management tool 110 is a centralized server-side application that is accessed by many users. Thus the display screen 130 may represent multiple computing devices/terminals that allow users to access and receive services from the project management tool 110 via networked computer communications.

In one embodiment, the computer system 100 further includes at least one database device 140 operably connected to the computing device 105 or a network interface to access the database device 140 via a network connection. In accordance with one embodiment, the database device 140 is configured to store and manage data structures (e.g., records of activities and resources) associated with the project management tool 110 in a database system (e.g., a program plan computer application).

Referring back to the logics of the project management tool 110 of FIG. 1, in one embodiment, the visual user interface logic 125 is configured to at least provide a graphical user interface (GUI) associated with a project planning computer application. For example, the visual user interface logic 125 includes program code that generates and causes the graphical user interface to be displayed based on an implemented graphical design of the interface. In response to user actions and selections via the GUI, associated aspects of tasks of a project plan may be edited and manipulated.

In one embodiment, the visual user interface logic 125 is also configured to facilitate the displaying of, on the display screen 130, an activities page view showing activities associated with a project. The visual user interface logic 125 is further configured to facilitate organizing and displaying of, on the display screen 130, a calendar view of an activity selected from the activities page view. The calendar view is configured to show different calendar time units over which the selected activity is to be performed. A calendar time unit may be, for example, a day, a week, a month, or a year.

For example, a monthly calendar view of activities is organized to show that an activity is to be performed over a five-day period from October 13 to October 17. Various examples of such activities page views and calendar views of activities are discussed in more detail with respect to subsequent figures along with examples of related project management functionality.

In one embodiment, the visual user interface logic 125 is also configured to facilitate the displaying of, on the display screen 130, resource calendar views of resources assigned to the selected activity. Many resources may be assigned to an activity for the purpose of performing the activity. Each resource has its own resource calendar. A resource calendar view shows different calendar time units for which a resource is assigned to the selected activity. Resources may include, for example, people, equipment, goods, and places for performing the activity.

For example, a monthly resource calendar view may show an associated resource being assigned to an activity for five days from October 13 to October 17, corresponding to the period over which the associated activity is to be performed. Examples of such resource calendar views are elaborated on later herein with respect to subsequent figures along with examples of related project management functionality.

In one embodiment, the visual user interface logic 125 is configured to facilitate the editing of the calendar view of the selected activity to change the number of the calendar time units over which the activity is to be performed. For example, when an activity is found to be on a "critical path" (i.e., the activity is to be started and finished at times which ensure that the project will end on schedule), a user of the project management tool 110 may change one or more "non-working" days in the calendar view of the activity to one or more "working" days. In this manner, the resources assigned to the activity can be assigned for the extra working days to ensure that the project gets completed by a certain date.

Also, in one embodiment, the visual user interface logic 125 is configured to facilitate the editing of a resource calendar view to change a number of calendar time units to which an associated resource is allocated or assigned. Examples of such editing are elaborated on later herein with respect to subsequent figures along with examples of related project management functionality.

In one embodiment, the activity management logic 115 is configured to generate at least one activity data structure defining at least a portion of a calendar view of an activity. For example, the activity management logic 115 may be configured to generate an activity record that defines various aspects of a calendar view of an activity. The various aspects of the calendar view of the activity may include, for example, dates and days associated with a month, and designated calendar time units (e.g., designated days) indicating a period of time over which the activity is to be performed. In accordance with one embodiment, the visual user interface logic 125 operably interacts with the activity management logic 115 to facilitate generating and displaying the calendar view of the activity.

In one embodiment, the activity management logic 115 is also configured to update the at least one activity data structure (e.g., the activity record) in response to editing of the calendar view of the activity. For example, the activity management logic 115 may update the activity record to reflect a change in the number of the calendar time units due to editing of the calendar view of the activity. In accordance with one embodiment, the visual user interface logic 125 operably interacts with the activity management logic 115 to facilitate editing of the calendar view of the activity.

In one embodiment, the resource management logic 120 is configured to generate resource data structures defining resource calendar views for resources assigned to an activity. For example, the resource management logic 120 may be configured to generate multiple resource records, one resource record for each resource, defining various aspects of each resource calendar view. The various aspects of a resource calendar view may include, for example, dates and days associated with a month, and designated calendar time units (e.g., designated days) indicating a period of time over which the associated resource is assigned or allocated to an activity. In accordance with one embodiment, the visual user interface logic 125 operably interacts with the resource management logic 120 to facilitate generating and displaying of a resource calendar view.

In one embodiment, the resource management logic 120 is configured to update at least a portion of the resource data structures (e.g., the resource records) in response to the activity management logic 115 updating the at least one activity data structure. For example, when the activity management logic 115 updates an activity record to reflect a change in a number of calendar time units in a corresponding calendar view of an activity, the resource records for the resources assigned to the activity may be automatically and immediately updated to reflect the change in the number of the calendar time units for the resource calendar views. In this manner, a user does not have to separately and manually edit the resource calendar views to make them correspond to the calendar view of the activity. Examples of such updating are elaborated on later herein with respect to subsequent figures along with examples of related project management functionality.

Also, in accordance with one embodiment, the resource management logic 120 is configured to identify available resources to the activity management logic 115. The activity management logic 115 is configured to modify at least one activity data structure of an activity to assign at least one of the available resources to the activity. For example, the resource management logic 120 may identify ten (10) resources that are available and operably interact with the activity management logic 115 to let the activity management logic 115 know.

The activity management logic 115 may decide that it can use six (6) of the ten (10) resources for a first activity and assign those six (6) resources to the first activity by modifying at least one data structure (e.g., a resource assignment record) associated with the first activity. In this manner, the six (6) resources get assigned to the first activity over the time period (e.g., designated number of calendar time units) of the first activity. In one embodiment, the resource management logic 120 can operably interact with the activity management logic 115 to find out that six (6) of the ten (10) resources have been assigned and are no longer available for other activities during the time period of the first activity.

The visual user interface logic 125 is configured to facilitate editing of a calendar view of an activity, via operable interaction with the activity management logic 115. In accordance with one embodiment, properties of a calendar time unit, of multiple calendar time units over which the activity is to be performed, are copied to a clipboard of the computing device 105. The copying is performed in response to user interaction with the calendar view of the activity via the graphical user interface of the project management tool 110.

The copied properties of the calendar time unit are then pasted from the clipboard to an unused calendar time unit in the calendar view of the activity. Similarly, the pasting is performed in response to user interaction with the calendar view of the activity via the graphical user interface of the project management tool 110. In this manner, a relatively simple copy/paste operation accomplishes the edit, resulting in extending the number of calendar time units (over which the activity is to be performed) within the calendar view of the activity.

Alternatively, properties of at least one calendar time unit, of multiple calendar time units over which the activity is to be performed, in the calendar view of the activity are reset to properties defining an unused calendar time unit. The resetting is performed in response to user interaction with the calendar view of the activity via the graphical user interface of the project management tool 110. In this manner, a relatively simple reset operation accomplishes the edit, resulting in reducing the number of calendar time units (over which the activity is to be performed) within the calendar view of the activity. In one embodiment, instead of resetting the properties, the properties are simply deleted to affect reducing of the number of calendar time units.

Again, in accordance with one embodiment, edits to the number of calendar time units in a calendar view of an activity are automatically and immediately reflected in the resource calendar views for the resources assigned to the activity. In this manner, a user (e.g., a project manager) does not have to separately and manually update the associated resource calendar views.

However, once the resource calendar views are automatically updated in response to editing a calendar view of an associated activity, a user may proceed to edit one or more of the resource calendar views. The visual user interface logic 125 is configured to facilitate editing of a resource calendar view to change a number of calendar time units to which an associated resource is allocated. The resource management logic 120 is configured to update at least one resource data structure (e.g., a resource record) associated with the resource calendar view, in response to editing the resource calendar view, to reflect the change in the number of calendar time units to which the associated resource is allocated.

In one embodiment, a resource data structure associated with a resource may be opened in response to user interaction with the graphical user interface. A corresponding resource calendar view is displayed in response to opening the resource data structure. The resource calendar view reflects any changes in the number of the calendar time units that were made in the calendar view of an associated activity to indicate an updated period of time over which the resource is assigned to the activity.

For example, there may be one-hundred (100) resources assigned to an activity that is to be performed over ten (10) days. Upon editing the calendar view for the activity, the resource calendar views for the one-hundred (100) resources are automatically updated. The user may realize, however, that two (2) of the one-hundred (100) resources are not really needed for three (3) of the ten (10) days. As a result, the user can edit the two (2) resource calendar views corresponding to the two (2) resources to de-allocate the two (2) resources for those three (3) days, without affecting the overall ten-day timeline for the activity. In this manner, ninety-eight (98) of the resources are automatically updated and two (2) of the resources are manually updated, resulting in a significant savings in time for the project manager.

However, there may be situations where editing a resource calendar will affect the overall timeline of an activity. Therefore, in one embodiment, the activity management logic 115 is configured to determine when a change in the number of calendar time units for which a resource is assigned to an activity affects the number of calendar time units over which the activity is to be performed. When such a determination is made, the activity management logic 115 may update an activity data structure of the activity to correspondingly change the number of the calendar time units over which the activity is to be performed.

Alternatively, the activity management logic 115 may dis-allow the change and operatively interact with the resource management logic 120 to prevent the change from being made in the resource data structure in the first place. A visual indication may be displayed on the display device 130 via the visual user interface logic 125 to indicate to the user that the edit he is trying to make will not be allowed (e.g., because the edit will negatively impact the overall timeline of the activity).

In this manner, many resource calendar views can be quickly updated to reflect a single edit to a calendar view of an activity. However, in one embodiment, editing of an individual resource calendar view does not affect other resource calendar views and may or may not affect the calendar view of an activity.

Figure 2:
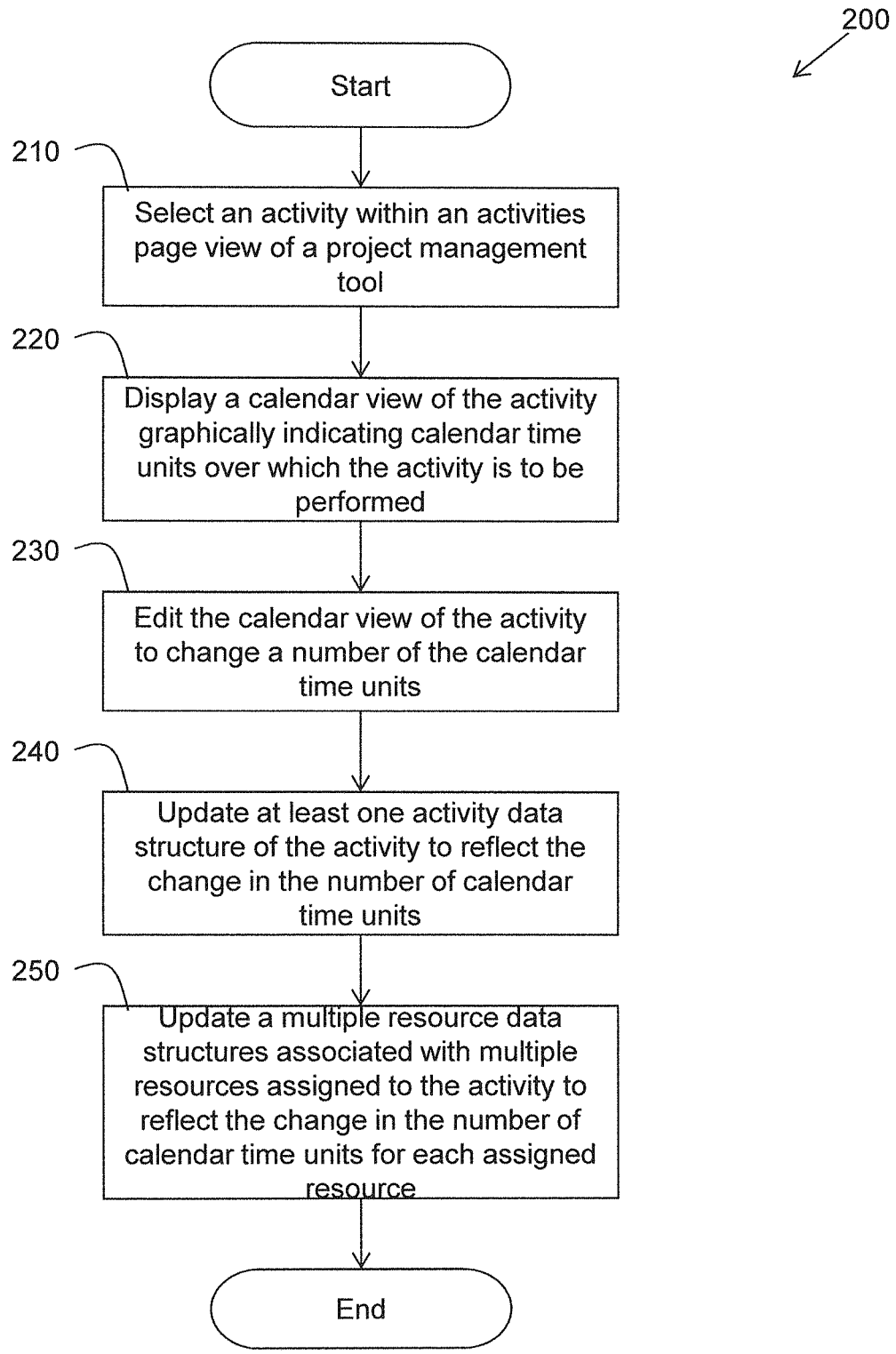
FIG. 2 illustrates one embodiment of a computer-implemented method, performed by the project management tool of the computer system of FIG. 1, for managing activities and resources of a project plan.

FIG. 2 illustrates one embodiment of a computer-implemented method 200, performed by the project management tool 110 of the computer system 100 of FIG. 1, for managing activities and resources of a project plan. Method 200 is implemented to be performed by the project management tool 110 of FIG. 1, or by a computing device configured with an algorithm of the method 200. Method 200 will be described from the perspective that activities and resources for a project can be defined by the project management tool 110 of the computer system 100 of FIG. 1.

However, some defined activities and resources may pre-exist, for example, in the database device 140 and can be accessed by the project management tool 110 to be viewed, updated, and assigned. For example, in one embodiment, pre-defined resources can be assigned to an activity and a pre-defined activity can be assigned to a project. Furthermore, in accordance with one embodiment, the functions of one or more of the various blocks of method 200 are initiated by a user via the graphical user interface.

Upon initiating method 200, at block 210, an activity is selected within an activities page view of a project management tool 110 in response to user interaction with a graphical user interface associated with the project management tool 110. In one embodiment, the project management tool 110 is associated with a computer application running on a computing device 105. At block 220, a calendar view of the activity is displayed in response to selecting the activity. The calendar view of the activity graphically indicates multiple calendar time units over which the activity is to be performed. In accordance with one embodiment, blocks 210 and 220 are performed by the visual user interface logic 125.

At block 230, the calendar view of the activity is edited, in response to user interaction with the graphical user interface, to change a number of the calendar time units. For example, a user (e.g., a project manager) of the project management tool 110 may want to extend the number of calendar time units for the activity to keep the associated project on track. The activity may be scheduled to be performed over a 5-day period (e.g., Monday through Friday) but is extended to be performed over a 6-day period (e.g., Monday through Saturday) by allocating assigned resources to work on a day that was not originally scheduled for work (i.e., Saturday). A user may perform a copy and paste operation in the calendar view of the activity, as discussed above herein, to initiate the extension.

At block 240, at least one activity data structure (e.g., an activity record) of the activity is updated. The update is made in response to editing the calendar view of the activity, to reflect the change in the number of the calendar time units within the at least one activity data structure. In this manner, the calendar time units are actually changed within the project management tool 110. In accordance with one embodiment, blocks 230 and 240 are performed by the visual user interface logic 125 via operable interaction with the activity management logic 115.

At block 250, multiple resource data structures (e.g., resource records) that are associated with multiple resources are updated in response to updating the at least one activity data structure at block 240. In one embodiment, the resource data structures are updated automatically and immediately. The resource data structures are updated to reflect the change in the number of the calendar time units for each resource of the multiple resources. In method 200, it is assumed that the multiple resources have been previously assigned to the activity for the calendar time units over which the activity is to be performed. In accordance with one embodiment, block 250 is performed by the resource management logic 120.

In this manner, by editing a calendar view of an activity to change an associated number of calendar time units over which the activity is to be performed, the resource calendars for all of the resources assigned to the activity are also updated accordingly. That is, the number of calendar time units for which each of the resources is allocated is updated accordingly. For example, if a number of calendar time units over which an activity is to be performed is changed from five (5) calendar days to six (6) calendar days in a calendar view of the activity, then the number of calendar time units that each assigned resource is allocated to the activity is changed to the same six (6) calendar days.

Figure 3:
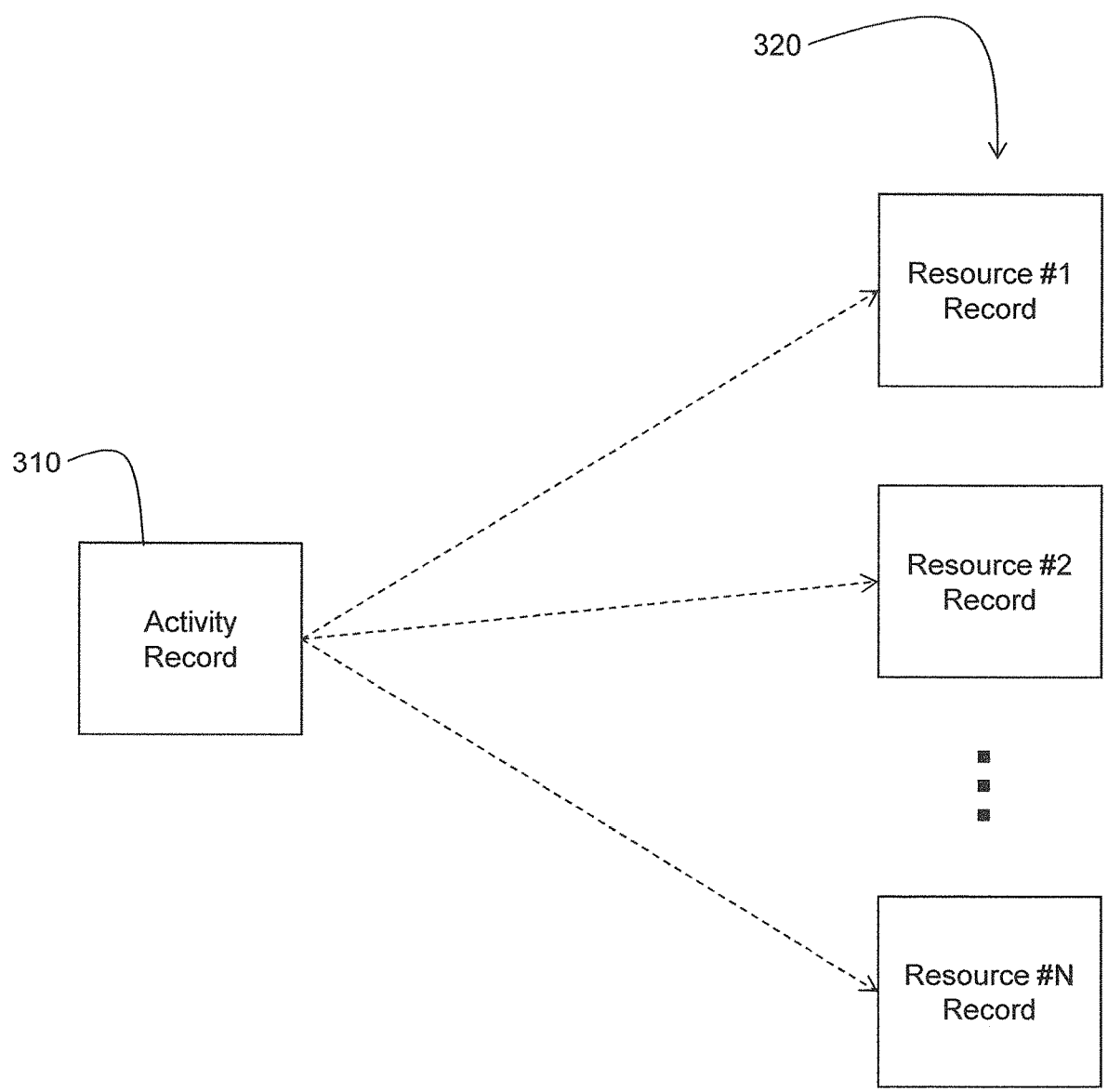
FIG. 3 illustrates one embodiment of how the system of FIG. 1 affects multiple resource calendar views by editing a single calendar view of an activity via the method of FIG. 2.

FIG. 3 illustrates one embodiment of how the system 100 of FIG. 1 affects multiple resource calendar views by editing a single calendar view of an activity via method 200 of FIG. 2. Referring to FIG. 3, a user of the project management tool 110 may edit a calendar view of an activity to change a number of calendar time units over which the activity is to be performed (e.g., to keep a project plan on schedule). In one embodiment, an activity record 310 is updated to manifest the change. In accordance with method 200 of FIG. 2, when an activity record 310 is updated to change the number of calendar time units, each of the resource records 320 of the resources assigned to the activity are also updated. In accordance with one embodiment, the activity management logic 115 operably interacts with the resource management logic 120 to affect the updating of the resource records 320.

In FIG. 3, the activity record 310 (a data structure) defines the activity within the system 100, and each resource record (a data structure) of the multiple resource records 320 defines a resource assigned to the activity within the system 100. Once created, the activity record 310 and the resource records may be stored in the database device 140, for example. In one embodiment, the activity record 310 and each resource record of the multiple resource records 320 include multiple data structures defining various aspects of the activity and resources, respectively.

For example, the activity record 310 may include a data structure that identifies the resources assigned to the activity. Furthermore, the activity record 310 may include a data structure that defines the calendar units over which the activity is to be performed, including specific calendar dates, hours of work, and other properties. Each resource record may include a data structure that identifies the corresponding resource along with various characteristics of the resource (e.g., a name and contact information of the resource if the resource is a person). Furthermore, each resource record may include a data structure that identifies the activity to which the resource is assigned along with specific calendar dates and hours of the day for which the resource is allocated to the activity.

In this manner, resource records are linked to an activity record such that a change to the activity record can affect a change to each resource record for each resource assigned to the associated activity. In particular, in one embodiment, a change to the calendar time units (in an activity record) over which the activity is to be performed can affect a corresponding change in the calendar time units (in a resource record) for which the corresponding resource is allocated.

Figure 4:
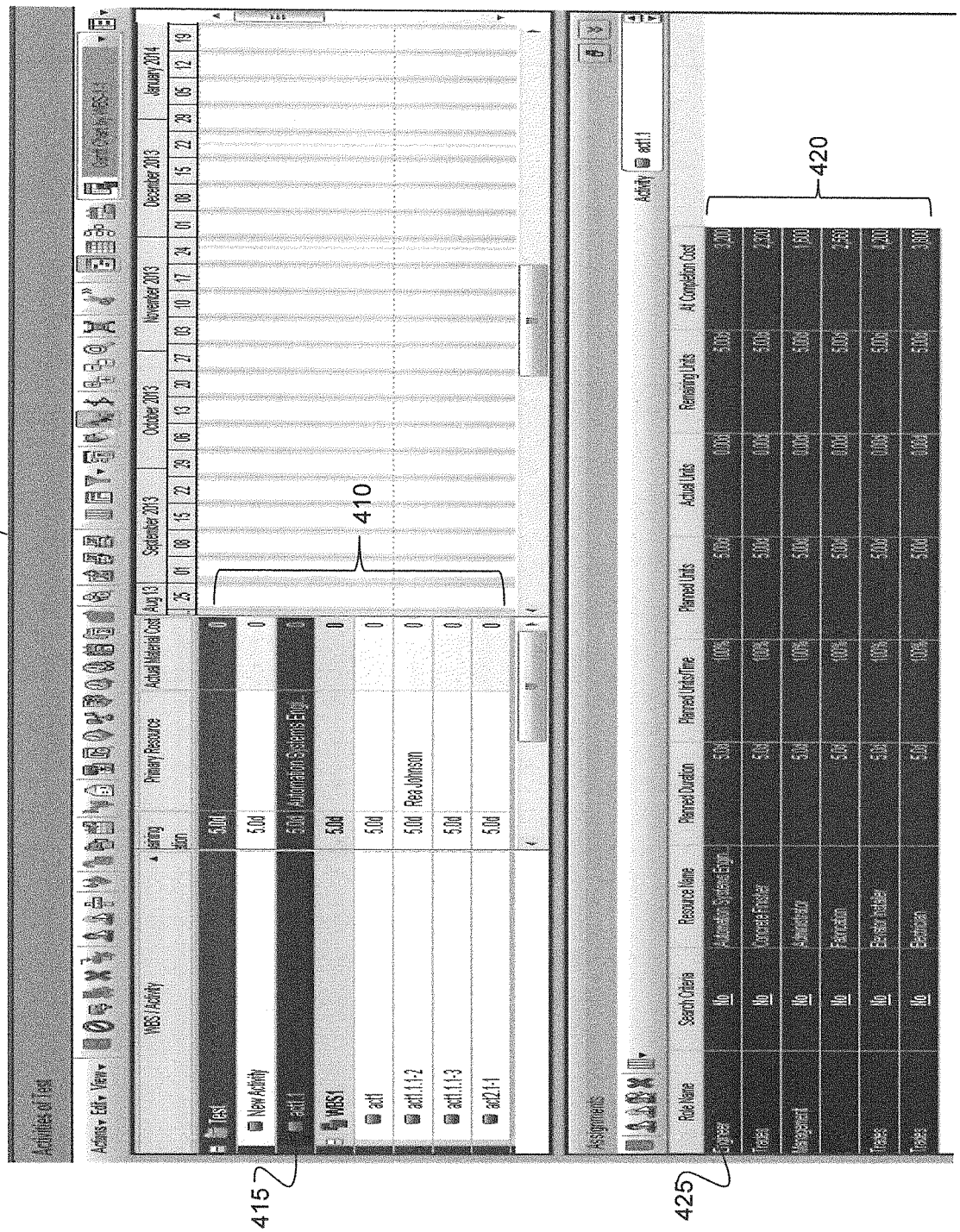
FIG. 4 illustrates one embodiment of an activities page view provided by a graphical user interface of the project management tool of FIG. 1.

FIG. 4 illustrates one embodiment of an activities page view 400 provided by the graphical user interface of the project management tool 110 of FIG. 1. The view 400 shows a list of several activities 410, one of which (activity 415) is hi-lighted. Also shown in the view 400 is a table of multiple resources 420 that are assigned to the hi-lighted activity 415. One of the assigned resources shown in the view 400 is that of an engineer 425. In one embodiment, a user may double click on the table entry of the engineer resource 425 to cause a resource calendar view for the engineer resource 425 to be displayed.

Figure 5:
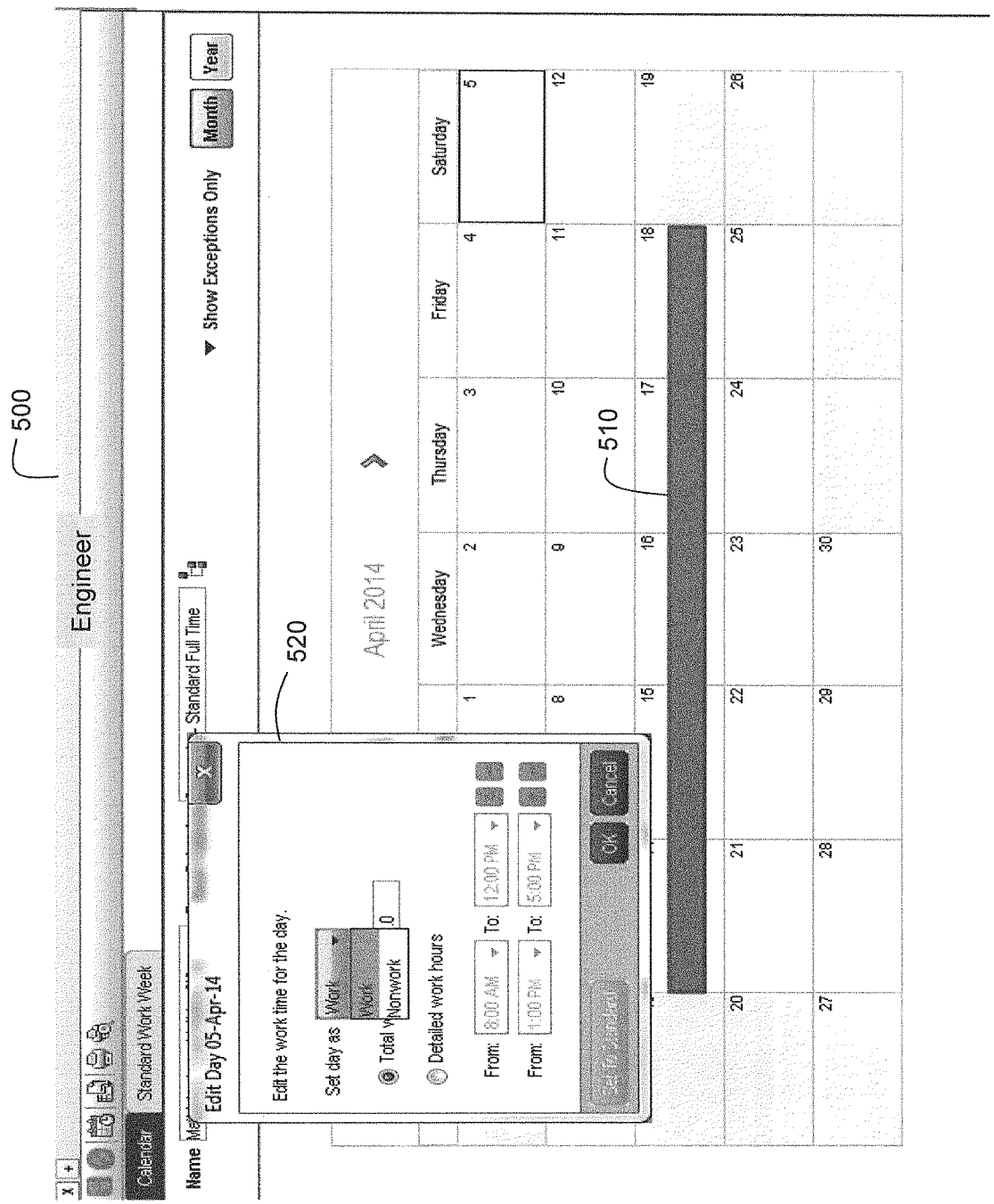
FIG. 5 illustrates one embodiment of a resource calendar view provided by the graphical user interface of the project management tool of FIG. 1.

FIG. 5 illustrates one embodiment of a resource calendar view 500 provided by the graphical user interface of the project management tool 110 of FIG. 1. The resource calendar view 500 corresponds to the engineer resource 425. As can be seen in FIG. 5, the engineer resource 425 is assigned to work on the activity 415 from Monday April 14 through Friday April 18, as indicated by the graphical bar 510 spanning the five (5) calendar time units from April 14 to April 18. FIG. 5 also shows a graphical edit box 520 which may be opened by a user in the resource calendar view 500 to edit the resource calendar view (e.g., to change the number of calendar time units; i.e., number of days in FIG. 5) for which the engineer resource 425 is assigned to work on activity 415.

Figure 6:
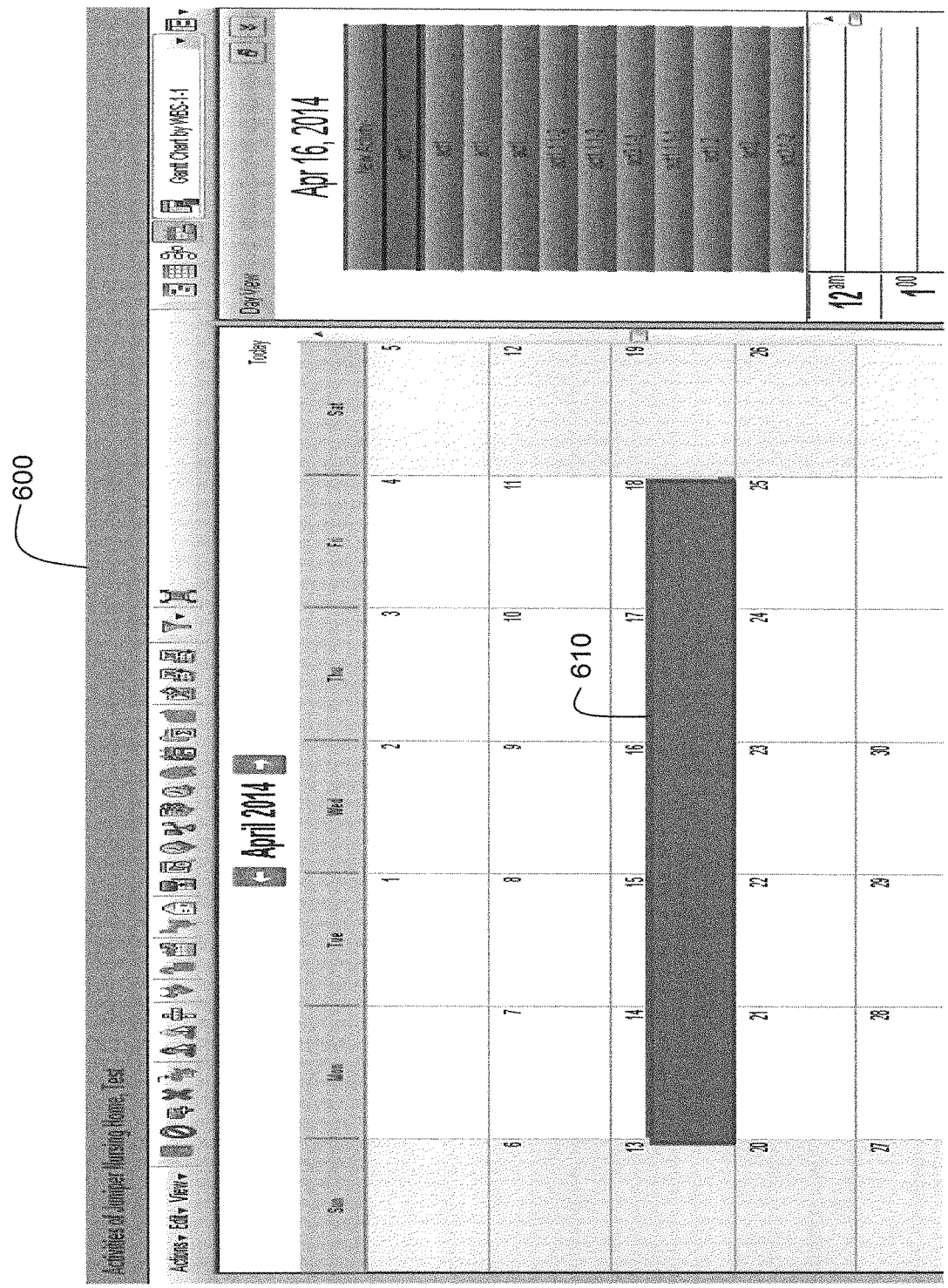
FIG. 6 illustrates one embodiment of a calendar view of an activity provided by the graphical user interface of the project management tool of FIG. 1.

Referring again to FIG. 4, in one embodiment, when a user double clicks on activity 415, a calendar view of activity 415 is opened. For example, FIG. 6 illustrates one embodiment of a calendar view 600 of the activity 415 provided by the graphical user interface of the project management tool 110 of FIG. 1. As indicated by the graphical bar 610 in FIG. 6, the activity 415 is to be performed over five (5) calendar time units (5-days) from Monday April 14 through Friday April 18. This also corresponds to the five (5) calendar time units for which the engineer resource 425 is assigned to the activity 415 (see FIG. 5).

In one embodiment, a user (e.g., a project manager) may edit the calendar view 600 of the activity 415 to extend the number of calendar time units over which the activity is to be performed. For example, the calendar view 600 may be edited to extend the number of calendar time units to six (6) days by including Saturday April 19 (e.g., to change Saturday April 19 from a non-working day to a working day).

Figure 7:
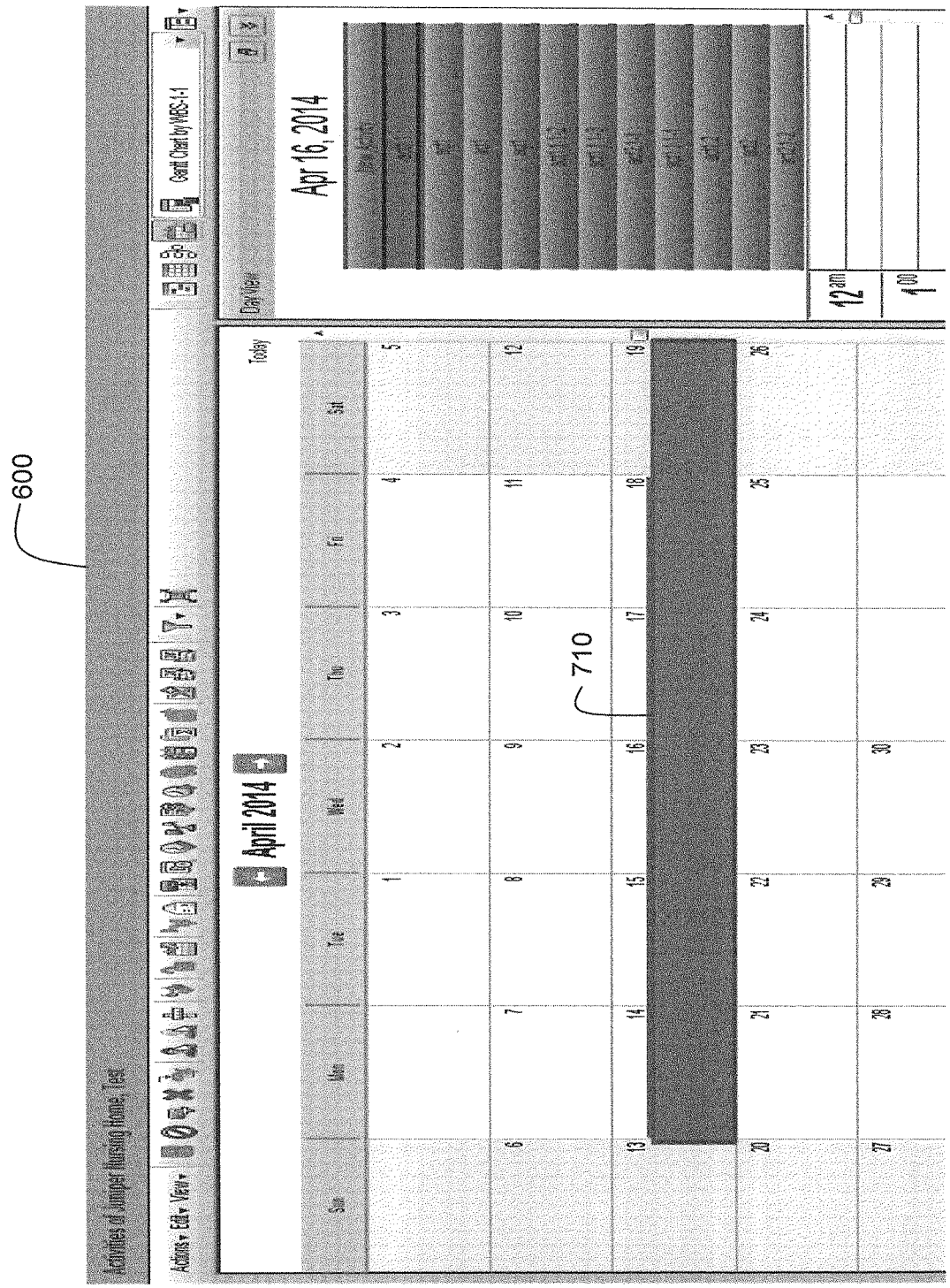
FIG. 7 illustrates one embodiment of an updated calendar view of an activity provided by the graphical user interface of the project management tool of FIG. 1.

FIG. 7 illustrates one embodiment of such an update to the calendar view 600 of FIG. 6 of the activity 415. In accordance with the embodiment of FIG. 7, a user may copy the properties from the calendar time unit for Friday April 18 and paste the properties to the calendar time unit for April 19 as indicated by the extended graphical bar 710. In accordance with one embodiment, a copy/paste operation is used as previously described herein. Such a copy/paste operation may involve first placing a computer cursor over the calendar time unit for April 18 and right clicking a computer mouse to select a "copy" function, and then placing the computer cursor over the calendar time unit for April 19 and right clicking the mouse to select a "paste" function. Alternatively, a user may similarly copy properties from a calendar time unit for one of April 14, 15, 16, or 17 and paste the properties to April 19.

In accordance with another embodiment, the extension to April 19 may be accomplished by "grabbing" the right edge of the graphical bar 610 and sliding it over to the end of the calendar time unit for April 19, forming graphical bar 710. For example, a user may place a computer cursor over the right edge of the graphical bar 610 and hold down a computer mouse button while moving the mouse to move the right edge. In this manner the calendar time unit for April 19 inherits the properties of the calendar time unit for April 18.

Figure 8:
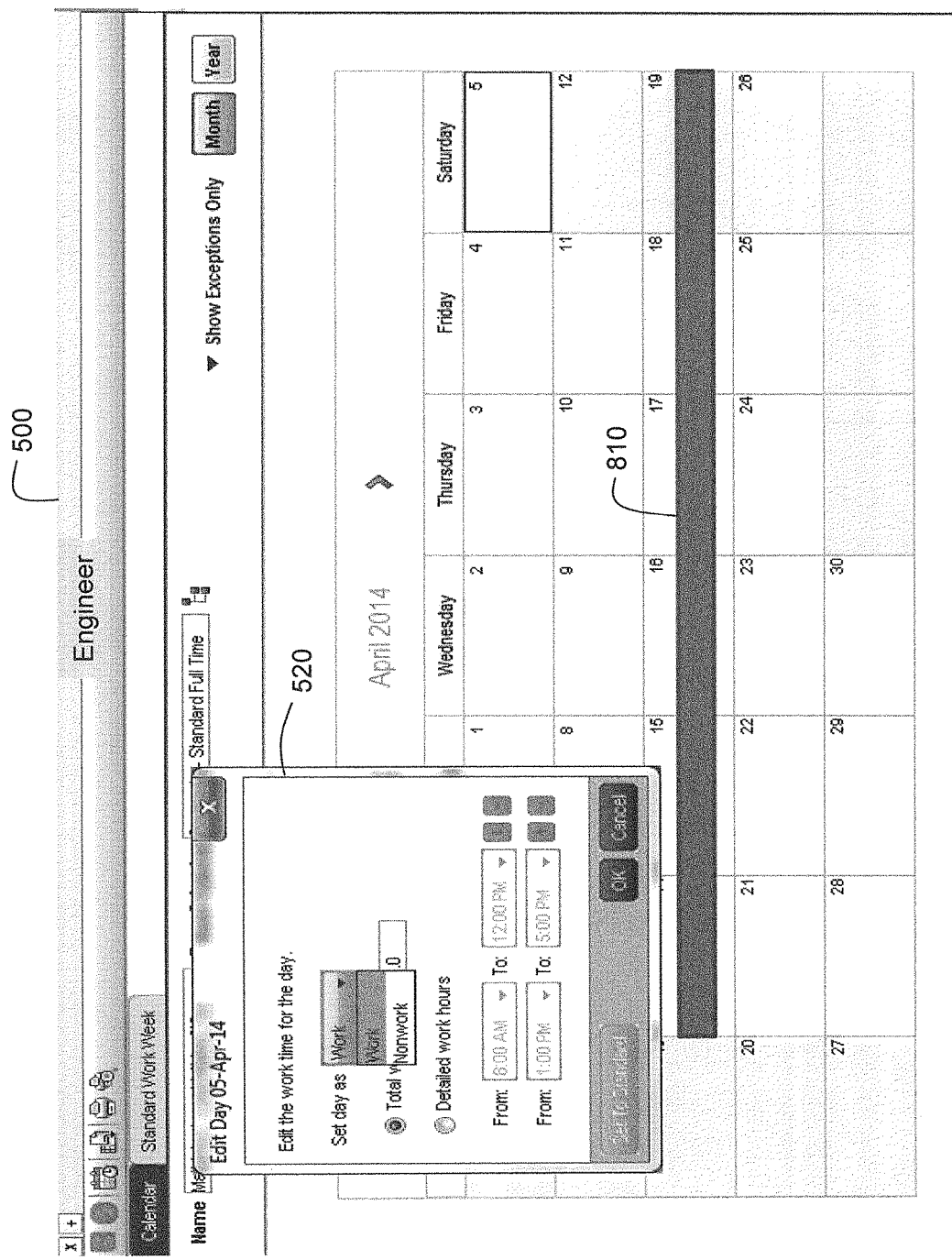
FIG. 8 illustrates an updated embodiment of the resource calendar view of FIG. 5.

In accordance with method 200 described herein, when a calendar view of an activity is edited to change the number of calendar time units over which the activity is to be performed, the corresponding resource calendar views for the assigned resources are automatically updated as well. For example, FIG. 8 illustrates that the resource calendar view 500 from FIG. 5 (corresponding to the engineer resource 425) has been automatically updated in response to editing the calendar view for the activity 415, as indicated by the extended graphical bar 810 in FIG. 8. Similarly, the resource calendar views for all of the assigned resources 420 are updated. In this manner, a user does not have to go back and separately update each resource calendar view to allocate resources to the extra day of Saturday April 19.

Systems, methods, and other embodiments for providing management of activities and resources of a project plan associated with a computer application have been described herein. In one embodiment, a calendar view of an activity is edited to change a number of calendar time units over which the activity is to be performed. In response to updating the calendar view of the activity, multiple resource data structures are updated for multiple resources assigned to the activity. The multiple resource data structures are updated to reflect the change in the number of the calendar time units for each assigned resource. For each assigned resource, the number of calendar time units corresponds to a period of time for which the resource is assigned to the activity. In this manner, a user (e.g., a project manager) does not have to update the calendar time units for each resource separately.

Computing Device Embodiment

Figure 9:
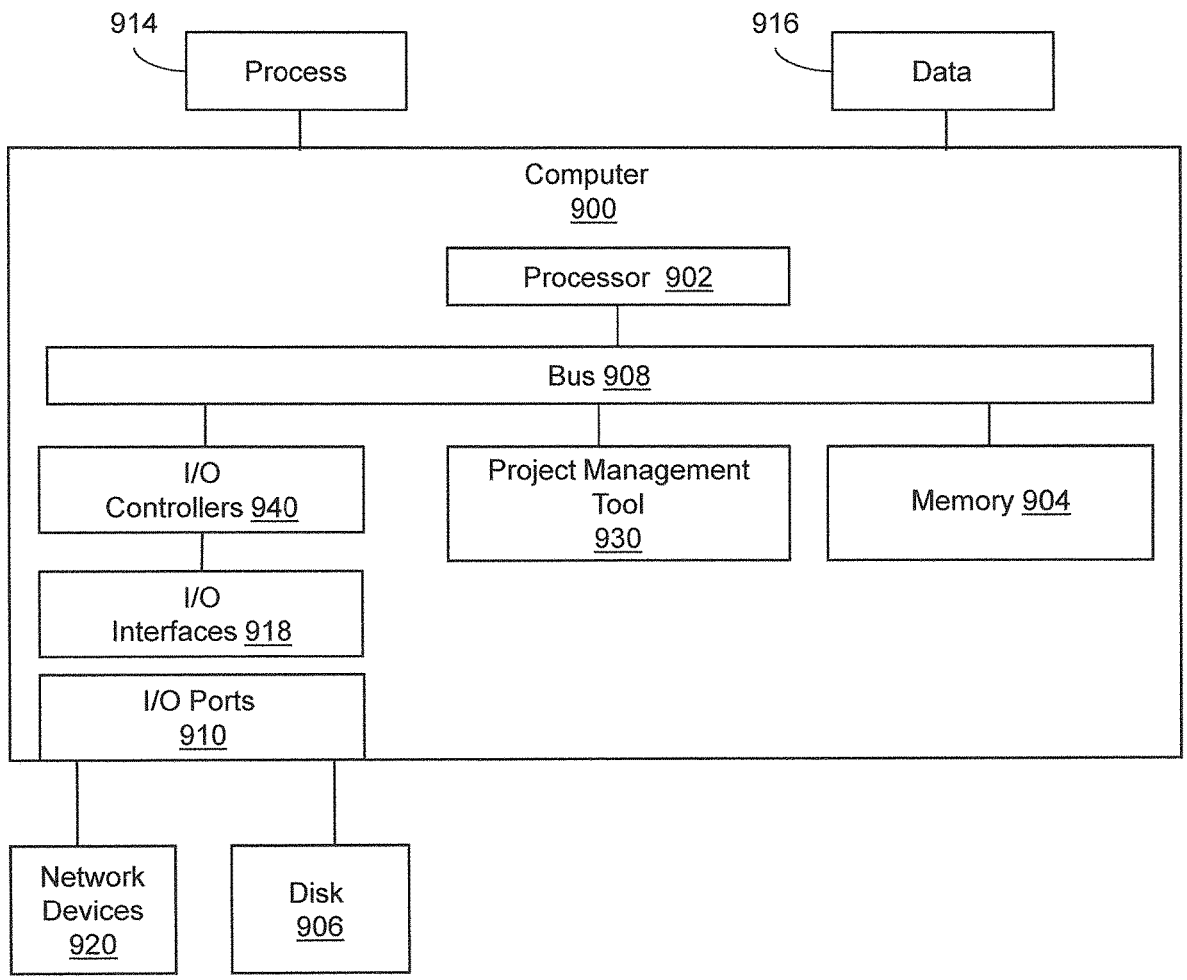
FIG. 9 illustrates one example embodiment of a computing device upon which the project management tool of the computing system of FIG. 1 may be implemented.

FIG. 9 illustrates an example computing device that is configured and/or programmed with one or more of the example systems and methods described herein, and/or equivalents. FIG. 9 illustrates one example embodiment of a computing device upon which an embodiment of a project management tool may be implemented. The example computing device may be a computer 900 that includes a processor 902, a memory 904, and input/output ports 910 operably connected by a bus 908. In one example, the computer 900 may include project management tool 930 configured to facilitate the management of activities and resources of a project plan similar to project management tool 110 shown in FIG. 1. In different examples, the tool 930 may be implemented in hardware, a non-transitory computer-readable medium with stored instructions, firmware, and/or combinations thereof. While the tool 930 is illustrated as a hardware component attached to the bus 908, it is to be appreciated that in other embodiments, the tool 930 could be implemented in the processor 902, stored in memory 904, or stored in disk 906.

In one embodiment, tool 930 or the computer 900 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the management of activities and resources of a project plan. The means may also be implemented as stored computer executable instructions that are presented to computer 900 as data 916 that are temporarily stored in memory 904 and then executed by processor 902.

Tool 930 may also provide means (e.g., hardware, non-transitory computer-readable medium that stores executable instructions, firmware) for facilitating the management of activities of a project plan.

Generally describing an example configuration of the computer 900, the processor 902 may be a variety of various processors including dual microprocessor and other multi-processor architectures. A memory 904 may include volatile memory and/or non-volatile memory. Non-volatile memory may include, for example, ROM, PROM, and so on. Volatile memory may include, for example, RAM, SRAM, DRAM, and so on.

A storage disk 906 may be operably connected to the computer 900 via, for example, an input/output interface (e.g., card, device) 918 and an input/output port 910. The disk 906 may be, for example, a magnetic disk drive, a solid state disk drive, a floppy disk drive, a tape drive, a Zip drive, a flash memory card, a memory stick, and so on. Furthermore, the disk 906 may be a CD-ROM drive, a CD-R drive, a CD-RW drive, a DVD ROM, and so on. The memory 904 can store a process 914 and/or a data 916, for example. The disk 906 and/or the memory 904 can store an operating system that controls and allocates resources of the computer 900.

The computer 900 may interact with input/output devices via the i/o interfaces 918 and the input/output ports 910. Input/output devices may be, for example, a keyboard, a microphone, a pointing and selection device, cameras, video cards, displays, the disk 906, the network devices 920, and so on. The input/output ports 910 may include, for example, serial ports, parallel ports, and USB ports.

The computer 900 can operate in a network environment and thus may be connected to the network devices 920 via the i/o interfaces 918, and/or the i/o ports 910. Through the network devices 920, the computer 900 may interact with a network. Through the network, the computer 900 may be logically connected to remote computers. Networks with which the computer 900 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, firmware, a non-transitory medium with stored instructions of an executable application or program module, and/or combinations of these to perform any of the functions or actions as disclosed herein, and/or to cause a function or action from another logic, method, and/or system to be performed as disclosed herein. Logic may include a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. Logic is limited to statutory subject matter under 35 U.S.C. § 101.

"User", as used herein, includes but is not limited to one or more persons, computers or other devices, or combinations of these.

"Operable interaction", as used herein, refers to the logical or communicative cooperation between two or more logics via an operable connection to accomplish a function.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method for providing a project management tool for allocating a plurality of resources within an activity:

selecting an activity, within an activities page view of a project management tool, in response to user interaction with a graphical user interface associated with a project management tool, wherein the project management tool is associated with a computer application running on a computing device comprising a processor for executing instructions from a memory;

displaying, by the processor, a calendar view of the activity for presentation to the user via the graphical user interface, in response to selecting the activity, wherein the calendar view of the activity graphically indicates a plurality of calendar time units over which the activity is to be performed;

editing, by the processor, the calendar view of the activity in response to user interaction with the graphical user interface, to change a number of the plurality of calendar time units, wherein editing the calendar view of the activity comprises extending the number of the plurality of calendar time units within the calendar view of the activity by copying, in response to a copy command by a user, properties of a calendar time unit of the plurality of calendar time units from the calendar view of the activity to a clipboard of the computing device, and pasting, in response to a paste command by the user, the copied properties from the clipboard to an unused calendar time unit in the calendar view of the activity;

dynamically updating, by the processor, at least one initial activity data structure of the activity, in response to the editing, to reflect the change in the number of the plurality of calendar time units within the at least one initial activity data structure by extending the number of the plurality of calendar time units within the calendar view of the activity;

in response to dynamically updating the at least one initial activity data structure, dynamically updating, by the processor, a plurality of initial resource data structures associated with a plurality of resources assigned to the activity over the plurality of calendar time units to reflect the change in the plurality of initial resource data structures by extending a number of a plurality of calendar time units within a calendar view of each of the plurality of resources such that the change in the plurality of initial resource data structures includes a change in the number of the plurality of calendar time units within a calendar view for each of the plurality of resources;

determining that at least one of the updated plurality of initial resource data structures needs to be edited due to a scheduling conflict;

in response to determining that at least one of the updated plurality of initial resource data structures needs to be edited due to a scheduling conflict, opening, in response to a selection by the user, a separate initial resource calendar view of a resource associated with the updated plurality of initial resource data structures such that the initial resource calendar view is a distinctly different graphical user interface screen than the calendar view of the activity, wherein the graphical user interface responds to the user interacting with the activity on the calendar view of the activity in order to open the initial resource calendar view of the resource;

editing the initial resource calendar view of the resource by copying, in response to the copy command by the user, properties of a calendar time unit of a plurality of calendar time units from the initial resource calendar view of the resource and pasting, in response to the paste command by the user, the copied properties of the calendar time unit from the initial resource calendar view to an unused calendar time unit in the initial resource calendar view to dynamically change the number of the plurality of calendar time units for which the resource is subsequently assigned to the activity as a result of the updated plurality of initial resource data structures by changing the number of the plurality of calendar time units for which the resource is subsequently assigned to the activity;

determining, by the processor, if the change to the number of the plurality of calendar time units for which the resource is subsequently assigned to the activity is not allowed; and in response to determining, by the processor, that the change to the number of the plurality of calendar time units for which the resource is subsequently assigned to the activity is not allowed, dynamically further updating, by the processor, at least one updated resource data structure associated with the resource, in response to editing an updated resource calendar view, to reflect the change in the least one updated resource data structure associated with the resource including the number of the plurality of calendar time units for which the resource is subsequently assigned to the activity.

2. The computer-implemented method of claim 1, wherein editing the calendar view of the activity comprises reducing, by the processor, the number of the plurality of calendar time units within the calendar view of the activity.

3. The computer-implemented method of claim 2, wherein reducing, by the processor, the number of the plurality of calendar time units within the calendar view of the activity comprises deleting, by the processor, properties of at least one calendar time unit of the plurality of calendar time units in the calendar view of the activity, in response to user interaction with the graphical user interface.

4. The computer-implemented method of claim 1, further comprising:
   determining, by the processor, in response to dynamically updating the at least one resource data structure associated with the resource, when the change in the number of the plurality of calendar time units for which the resource is assigned to the activity affects the number of the plurality of calendar time units over which the activity is to be performed.

5. The computer-implemented method of claim 1, wherein each calendar time unit of the plurality of calendar time units comprises one of a day, a week, a month, or a year.

6. The computer-implemented method of claim 1, wherein the plurality of resources includes at least one of people, equipment, goods, and places for performing the activity.

7. A computing system having a processor for executing instructions from a memory for providing a project management for allocating a plurality of resources within an activity tool, comprising:
   a display screen;
   visual user interface logic configured to:
      (i) provide, by the processor, a graphical user interface associated with a project management tool,
      (ii) facilitate displaying, by the processor, views of a project management tool on the display screen, including an activities page view, a calendar view of an activity, and resource calendar views of resources assigned to the activity, and
      (iii) facilitate editing of the calendar view of the activity, by the processor, to change a number of a plurality of calendar time units over which the activity is to be performed, wherein the editing is to be performed by via the graphical user interface by a user by copying properties of a calendar time unit of the plurality of calendar time units to a clipboard of the computing system, and pasting by commands from the user the copied properties of the calendar time unit from the clipboard to an unused calendar time unit in the calendar view of the activity;
   activity management logic configured to:
      (i) generate, by the processor, at least one initial activity data structure defining at least a portion of the calendar view of the activity, and
      (ii) dynamically update, by the processor, the at least one initial activity data structure, in response to the editing of the calendar view of the activity, to reflect the change in the number of the plurality of calendar time units associated with the updated at least one initial activity data structure by extending the number of the plurality of calendar time units within the calendar view of the activity; and
   resource management logic configured to:

(i) generate, by the processor, a plurality of initial resource data structures defining the resource calendar views, (ii) dynamically update, by the processor, at least a portion of the plurality of initial resource data structures, in response to the activity management logic updating the at least one initial activity data structure, to reflect the change in the at least a portion of the plurality of initial resource data structures by extending a number of a plurality of calendar time units within a calendar view of each of a plurality of resources such that the change in the at least a portion of the plurality of initial resource data structures includes a change in the number of the plurality of calendar time units in the resource calendar views for each resource of the resources assigned to the activity, (iii) determine that the updated plurality of initial resource data structures needs to be edited due to a scheduling conflict;

(iv) in response to determining that at least one of the updated portion of the plurality of initial resource data structures needs to be edited due to a scheduling conflict, open, in response to a selection by the user, a separate initial resource calendar view of a resource associated with the updated portion of the plurality of initial resource data structures such that the initial resource calendar view is a distinctly different graphical user interface screen than the calendar view of the activity, wherein the user interacts with the activity on the calendar view of the activity in order to open the initial resource calendar view of the resource;

(v) edit the initial resource calendar view of the resource by copying, in response to a copy command by the user, properties of a calendar time unit of a plurality of calendar time units from the initial resource calendar view of the resource and pasting, in response to a paste command by the user, the copied properties of the calendar time unit from the initial resource calendar view to an unused calendar time unit in the initial resource calendar view to dynamically change the number of the plurality of calendar time units for which the resource is assigned to the activity as a result of the updated at least a portion of the plurality of initial resource data structures by changing the number of the plurality of calendar time units for which the resource is subsequently assigned to the activity;

(vi) determine, by the processor, if the change to the number of the plurality of calendar time units for which the resource is subsequently assigned to the activity is not allowed; and (vii) in response to determining, by the processor, that the change to the number of the plurality of calendar time units for which the resource is subsequently assigned to the activity as a result of the updated at least a portion of the plurality of initial resource data structures is not allowed, dynamically further update, by the processor, the updated at least a portion of the plurality of updated resource data structures associated with the resource, in response to editing an updated resource calendar view, to reflect the change in the updated at least a portion of the plurality of initial resource data structures associated with the resource including the number of the plurality of calendar time units for which the resource is initially assigned to the activity.

8. The computing system of claim 7, wherein:
the resource management logic is configured to identify, by the processor, available resources to the activity management logic; and
the activity management logic is configured to modify, by the processor, the at least one activity data structure to assign at least one of the available resources to the activity.

9. The computing system of claim 7, wherein the visual user interface logic is configured to facilitate editing of the calendar view of the activity, by the processor, via operable interaction with the activity management logic, to change a number of a plurality of calendar time units over which the activity is to be performed by:
resetting, by the processor, properties of at least one calendar time unit of the plurality of calendar time units in the calendar view of the activity to properties defining an unused calendar time unit, in response to user interaction with the graphical user interface.

10. A non-transitory computer-readable medium storing computer-executable instructions that are part of an algorithm that, when executed by a processor of a computer, cause the processor to perform a method for providing a project management tool for allocating a plurality of resources within an activity, wherein the instructions comprise instructions configured for:
in response to selecting an activity, within an activities page view of a project management tool, by user interaction with a graphical user interface associated with a project management tool, displaying, by the processor, a calendar view of the activity, wherein the calendar view of the activity graphically indicates a plurality of calendar time units over which the activity is to be performed;
editing, by the processor, the calendar view of an activity of a project plan, in response to user interaction with a graphical user interface, to change a number of a plurality of calendar time units over which the activity is to be performed, wherein the instructions for editing the calendar view comprise instructions configured for copying, in response to a copy command by a user, properties of a calendar time unit of the plurality of calendar time units from the calendar view of the activity to a clipboard of the computer and wherein the instructions for editing the calendar view further comprise instructions configured for pasting, in response to a paste command by the user, the copied properties from the clipboard to an unused calendar time unit in the calendar view of the activity;
dynamically updating, by the processor, at least one initial activity data structure of the activity, in response to the editing, to reflect the change in the number of the plurality of calendar time units within the at least one initial activity data structure by extending the number of the plurality of calendar time units within the calendar view of the activity;
in response to updating the at least one initial activity data structure, dynamically updating, by the processor, a plurality of initial resource data structures associated with a plurality of resources assigned to the activity over the plurality of calendar time units to reflect the change in the plurality of initial resource data structures by extending a number of a plurality of calendar time units within a calendar view of each of the plurality of resources such that the change in the plurality of initial resource data structures includes a change in the number of the plurality of calendar time units for each of the plurality of resources;

determining that the updated plurality of initial resource data structures needs to be edited due to a scheduling conflict;

in response to determining that at least one of the updated plurality of initial resource data structures needs to be edited due to a scheduling conflict, opening, in response to a selection by the user, a separate initial resource calendar view of a resource associated with the plurality of initial resource data structures such that the initial resource calendar view is a distinctly different graphical user interface screen than the calendar view of the activity, wherein the user interacts with the activity on the calendar view of the activity in order to open the initial resource calendar view of the resource;

editing the initial resource calendar view of the resource by copying, in response to the copy command by the user, properties of a calendar time unit of a plurality of calendar time units from the initial resource calendar view of the resource and pasting, in response to the paste command by the user, the copied properties of the calendar time unit from the initial resource calendar view to an unused calendar time unit in the initial resource calendar view to dynamically change the number of the plurality of calendar time units for which the resource is assigned to the activity as a result of the updated plurality of initial resource data structures associated with a plurality of resources by changing the number of the plurality of calendar time units for which the resource is subsequently assigned to the activity;

determining, by the processor, if the change to the number of the plurality of calendar time units for which the resource is subsequently assigned to the activity is not allowed; and in response to determining, by the processor, that the change to the number of the plurality of calendar time units for which the resource is subsequently assigned to the activity is not allowed, automatically further updating, by the processor, at least one updated resource data structure associated with the resource, in response to editing an updated resource calendar view, to reflect the change in the least one updated resource data structure associated with the resource including the number of the plurality of calendar time units for which the resource is subsequently assigned to the activity.

11. The non-transitory computer-readable medium of claim 10, wherein the instructions for editing, by the processor, the calendar view comprise instructions configured for resetting, by the processor, properties of at least one calendar time unit of the plurality of calendar time units in the calendar view of the activity to properties defining an unused calendar time unit, in response to user interaction with the graphical user interface.

12. The non-transitory computer-readable medium of claim 10, wherein the instructions for editing, by the processor, the resource calendar view comprise instructions configured for changing, by the processor, a number of a plurality of calendar time units to which an associated resource is allocated without affecting the change in the number of the plurality of calendar time units over which the activity is to be performed.

* * * * *